April 6, 1965 J. A. GITHENS 3,177,472

DATA CONVERSION SYSTEM

Filed Dec. 15, 1960 5 Sheets-Sheet 1

INVENTOR
J. A. GITHENS
BY
ATTORNEY

April 6, 1965 J. A. GITHENS 3,177,472

DATA CONVERSION SYSTEM

Filed Dec. 15, 1960 5 Sheets-Sheet 2

INVENTOR
J. A. GITHENS
BY [signature]
ATTORNEY

INVENTOR
J. A. GITHENS
BY [signature]
ATTORNEY

INVENTOR
J. A. GITHENS
BY
ATTORNEY

April 6, 1965 J. A. GITHENS 3,177,472

DATA CONVERSION SYSTEM

Filed Dec. 15, 1960 5 Sheets-Sheet 5

INVENTOR
J. A. GITHENS
BY [signature]
ATTORNEY

United States Patent Office 3,177,472
Patented Apr. 6, 1965

3,177,472
DATA CONVERSION SYSTEM
John A. Githens, Morristown, N.J., assignor to Bell Telephone Laboratories, Incorporated, New York, N.Y., a corporation of New York
Filed Dec. 15, 1960, Ser. No. 75,950
10 Claims. (Cl. 340—172.5)

This invention relates to automatic control equipment and more particularly to control equipment responsive at particular times to prerecorded data.

Whenever a sequence of discrete operations is to be performed, it is possible to identify each operation in code form and to accurately control the initiation and termination of each operation in the sequence by making the equipment responsive to properly presented code data. The discrete code forms, for example, may be prerecorded on a magnetic drum, magnetic tape, perforated tape, or any other recording medium. Reading means may be supplied for sequentially reading-out the code forms and exercising control over the equipment at predetermined times.

An object of this invention is to provide a system for the interpretation and translation of previously recorded data at particular predetermined times.

In any system where prerecording is used, errors will be introduced from a variety of sources, the most obvious being inaccurate transcription on the recording medium. Also, if the prerecorded data is accumulated at a remote point and transmitted to the place where it is to be used, noise and transmission failures may change or obliterate the code forms. Numerous techniques exist for detecting an error in code form where only a discrete number of forms is used for information purposes. Parity checking is among the more familiar of these error detection techniques.

By identifying each code form with the time at which the operation it represents is to be performed, system errors due to incorrect code forms may be minimized. With such an arrangement, inaccurate or incorrect data may be detected and disregarded without interfering with the time relationship between the time at which the data is to be used and actual time.

Another object of this invention is to provide a system responsive to prerecorded information at predetermined times which is protected against misoperation due to inaccurate prerecording, distorted code data, or lack of timing synchronization.

The present invention is disclosed in an illustrative embodiment designed to function as part of a satellite communication system comprising an airborne satellite repeater operating in cooperation with earth-based transmitters and receivers. Such a system relies upon the transmission paths between the satellite and the transmitter and receiver and consequently is directly dependent upon the accuracy with which the transmitting and receiving antennas track the satellie. The instant system contemplates use of predicted orbital position in order to compute exact antenna positions for optimum transmission efficiency at all times. A central computing point is assumed, at which the satellite's orbital position and corresponding antenna directions at particular times are computed. The information regarding antenna position is then encoded and transmitted to the antenna sites for application. The received information is thereupon processed and translated by the circuitry of this invention for use in controlling antenna positioning linkages.

From another aspect, therefore, an object of the invention is the establishment of a satellite tracking system for use in satellite communications.

Specifically, an illustrative embodiment of the invention includes a data conversion system operative upon encoded data and producing outputs at predetermined times for driving antenna positioning servomechanisms. In the embodiment disclosed, perforated tape is selected as a data recording medium and antenna positioning data is recorded thereon by means of standard teletypewriter equipment controlled from the aforementioned central computing point. The antenna positioning data is represented by "words" comprising a plurality of "characters", each character being composed of a plurality of bits in accordance with a standard binary code representation of the decimal digits, 0 through 9, plus a parity checking bit. Each word is discretely identified by a "tag" comprising a discrete character made up of code representations unused for the decimal digit encoding. Each tag is recorded immediately after the word it identifies. A collection of words and tags corresponding to a particular data point composes a data block, and each data block has a time word with identifying time tag preceding it.

A feature of the invention resides in the above-described format which renders the entire system less dependent upon the particular sequence in which the data is presented and more tolerant of errors arising due to transmission difficulties.

Another feature of the invention resides in means for synchronizing the time words with actual time to insure decoding of data points at the correct time only.

In accordance with the last-mentioned feature when the data time corresponds to actual time, the words following it are decoded and used to control the antennas. In the event the time word and actual time do not correspond, several additional operations are performed with the subject of re-establishing correspondence or giving alarm in the event this is not feasible.

Because the data is prerecorded, all information concerning the data is known at the time of recording and it is therefore possible to insert auxiliary information concerning the rate at which the data points are varying. If we assume that the data recorded is the antenna position for every two-second interval, the auxiliary data may indicate the difference in value between data words within the assumed two-second interval. Such auxiliary information makes possible the continuous modification of the antenna control signals in order to yield values equal to the recorded data point at the next succeeding time even if the next succeeding data point must be disregarded due to error or obliteration.

Another feature of the invention thus resides in means for utilizing auxiliary data to update the control information and thereby enable the system to ignore or miss data blocks without seriously impairing the system accuracy.

Broadly, the invention is embodied in a data translation system for satellite communications wherein words on a perforated tape represent respectively, time, azimuth, azimuth rate of change, elevation, and elevation rate of change, each encoded for use in tracking the satellite repeater. Each word is identified by a signal or tag immediately following it. The timing word is compared with a local timer and if in synchronism therewith, the subsequent words are decoded. If not in synchronism, the subsequent words are by-passed and the next timing word examined. If still not in synchronism, an alarm is given and further checking continues until synchronism is reestablished.

Other objects and features of the present invention will be apparent from the following description in conjunction with the drawings wherein.

Figures 1, 2, 3:
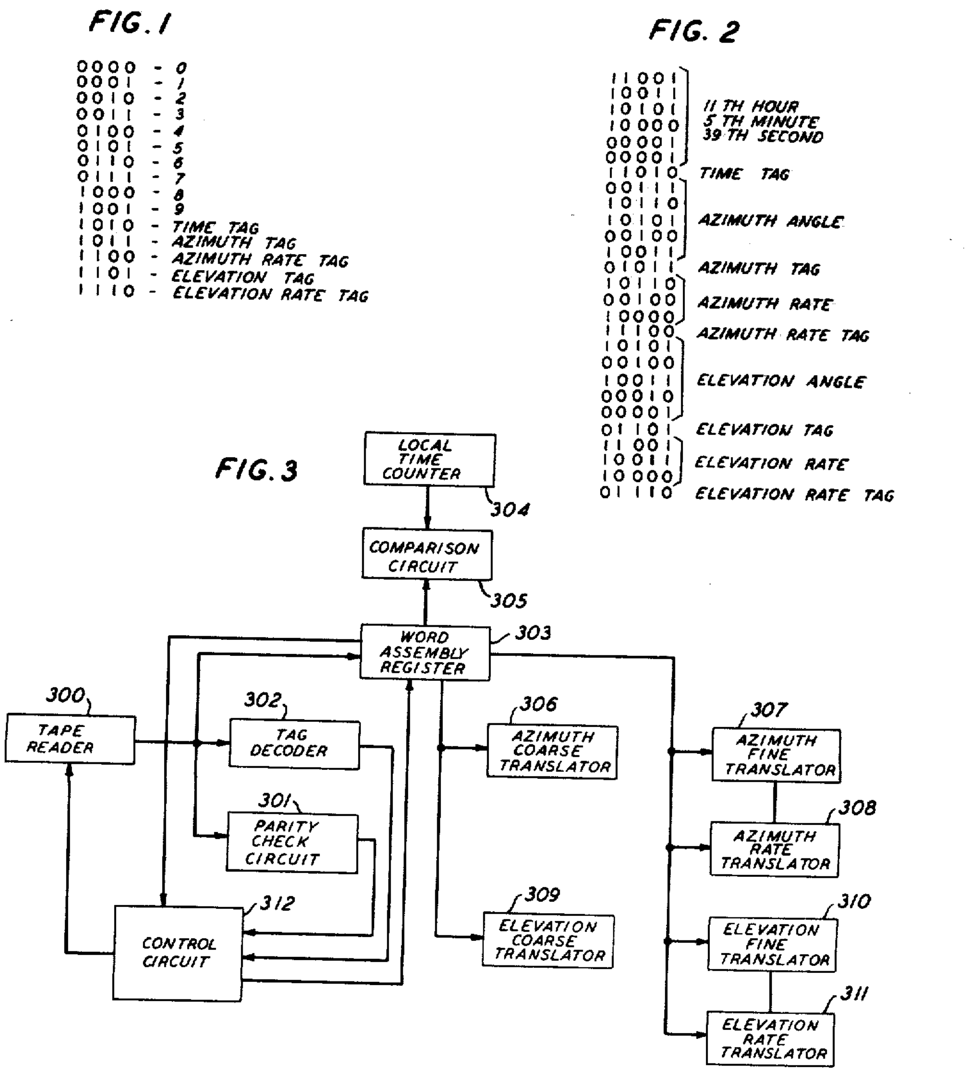
FIG. 1 is a tabulation of the binary code employed in the illustrative embodiment of the invention.
FIG. 2 represents the code characters on a typical portion of tape for use in the illustrative embodiment.
FIG. 3 is a block diagram of the illustrative embodiment showing the basic components of the invention.

The conventions employed in reducing the data concerning time and antenna position to a code, are shown in FIG. 1. The standard binary representation required for decimal digits 0–9 has been adopted, leaving six available and unused combinations (denoting 10 to 14) for use as tags. Each character comprises four discrete bits which may assume either a "0" or "1" state. As mentioned hereinafter, an additional bit may be included in each character in order to provide for parity error detection. Such a parity bit appears, for example, in the left-hand column of FIG. 2 of the drawings. As is taught in section 12.4 of "The Design of Switching Circuits," by Keister, Ritchie and Washburn, D. Van Nostrand, 1951, single coding or transmission errors can be detected through the use of an added bit in each code group chosen so that all valid codes include an odd (or, alternatively, an even) number of bits of a chosen state. The code shown in FIG. 2, for example, employs odd parity, each code group including an odd number of bits in the "1" state.

For purposes of description, a punched paper tape has been selected as the recording medium upon which the predicted positioning data is stored. FIG. 2 illustrates the layout of a typical block of data. In considering FIG. 2, it may be assumed that the 1's represent holes in the tape and the 0's represent unmarked positions. The first word (reading from the top in FIG. 2) encountered as the tape is passed through a reader will designate the time at which the data block is to control the antenna position. As illustrated, the sample data block is to be used the 11th hour, 5th minute, and 39th second. The time word comprises six characters, two denoting the hour, two denoting the minutes and two denoting the seconds. Immediately following the time word is its identifying tag 1010 and subsequent thereto, the azimuth angle word.

Azimuth angle is denoted by five characters and, therefore, permits the identification of 100,000 discrete increments, each increment representing 0.0036 degree. The azimuth angle word is identified by azimuth tag 1011. The next word appearing on the tape, the azimuth rate word, indicates the difference in value between the preceding azimuth angle and the azimuth angle two seconds later. In the illustrative embodiment, the difference between successive azimuth words will not exceed 3.6 degrees or three decimal digits. The least significant of these digits may be neglected and consequently only two characters are required in the rate word, for magnitude. A third character is required in order to indicate the direction of change between azimuth words.

Immediately after the azimuth information, the elevation angle is encoded. The format of the elevation angle word will comprise five characters representing decimal values of 50 to 25,000, or 0.0036 degree per increment. This format will include the area from horizontal to vertical. Following the elevation angle, the elevation rate is encoded in the same fashion as that described for the azimuth rate. Of course, each word is identified by its discrete tag.

The operations to be performed in order to direct the antenna positions under the control of the prerecorded data may now be considered. The data must first be received and read under the control of a local timing device. Decoding or translation must then be selectively performed and discrete outputs produced for controlling the antenna positioning servomechanisms. For accuracy and reliability, the translation means must protect against simple errors due to distortion or original errors in transcription and also must protect against nonsynchronization of the data block with the local timing mechanism.

FIG. 3 illustrates the basic components used in the present illustrative embodiment to perform the operations required. A perforated tape is inserted in the tape reader 300 and each character read under the control of control circuit 312. Each character is examined by parity check circuit 301 to determine whether any errors are present. Simultaneously with the parity check, tag decoder 302 investigates the character to determine whether or not it is one of the five discrete tags employed. If it is not a tag, this information is relayed to control circuit 312 which enables gates to store the character in Word Assembly Register 303.

If a tag is detected, it will either be a time tag or a tag identifying azimuth, elevation, or rate words. If it is a time tag, the time word stored in Word Assembly Register 303 has been compared via comparison circuit 305 with local time counter 304 and the results of the comparison are known. Assuming correspondence, control circuit 312 enables circuitry to initiate translation as subsequent data is read. In the event of noncorrespondence, however, the gating circuits which control translation of data under normal circumstances are disabled, and the succeeding data by-passed until the next time tag is detected. Should correspondence now be indicated, the gating circuits will be enabled and operations proceed normally. However, should a second noncorrespondence occur, the gating circuits will again be disabled and continued advancement of the tape inhibited with the time word remaining in position in Word Assembly Register 303 until correspondence occurs. During cessation of tape movement, an alarm is furnished in order to permit manual supervision by an attendant.

In the event a tag other than time is detected by tag decoder 302, the control circuit 312 is informed of the particular tag detected and the word stored in the Word Assembly Register 303 is gated under the control of control circuit 312 into appropriate translators 306 through 311.

As will be more fully developed hereinafter, control circuit 312 controls: advancement and reading of the perforated tape; storage of information in Word Assembly Register 303; and gating of the words stored in Word Assembly Register 303 into appropriate translators. The translators are designed to generate signals for controlling antenna servomechanisms. Specifically, pulse position modulated or pulse duration modulated outputs are produced which are representative of the antenna positions to be assumed. These output signals may be utilized in any well-known fashion to generate analog voltages for control purposes.

Figure 4:
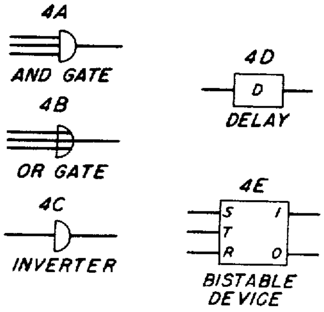
FIG. 4 illustrates the logic convention employed in the logic diagram which follows.
Figure 6:
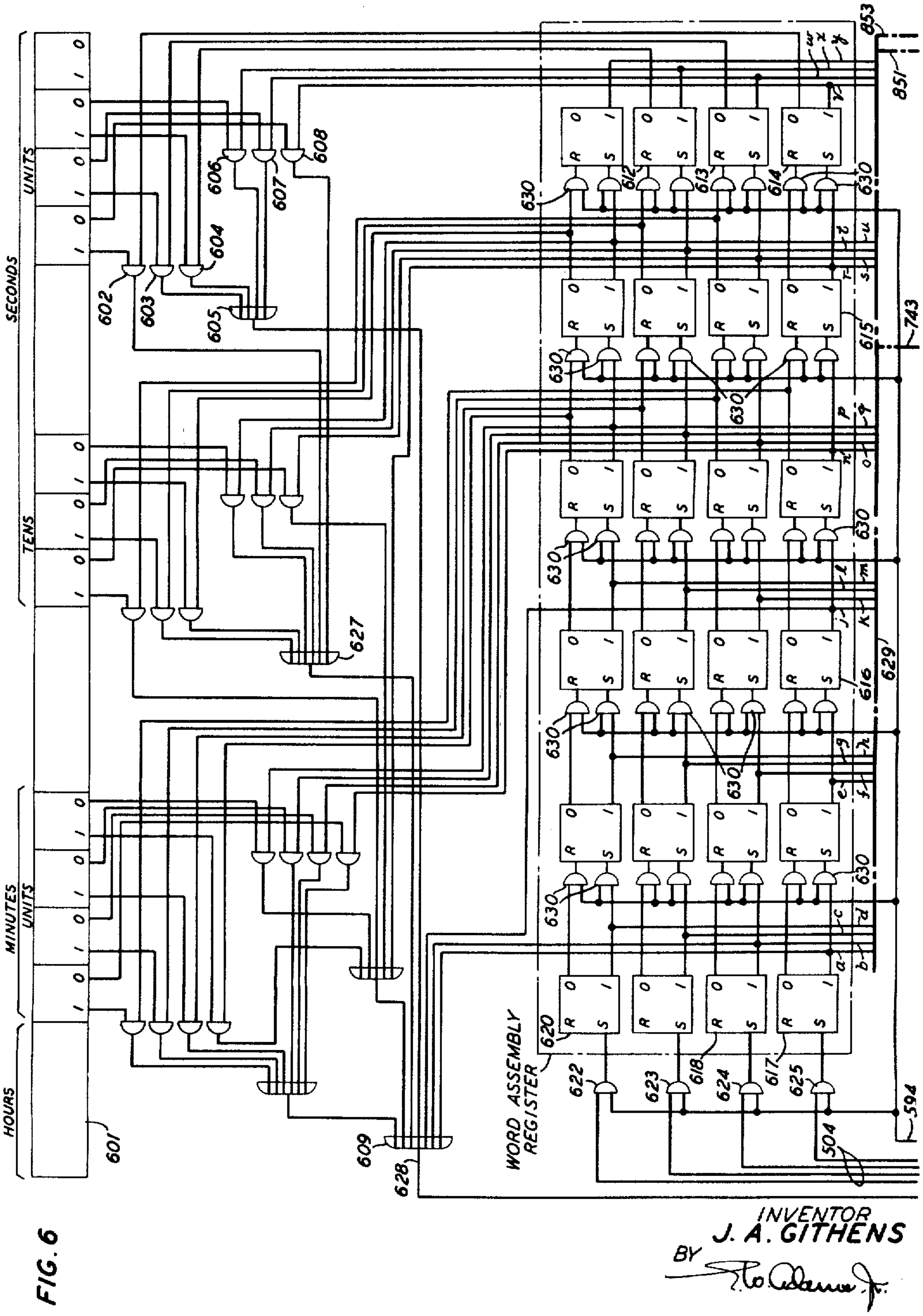
Figure 7:
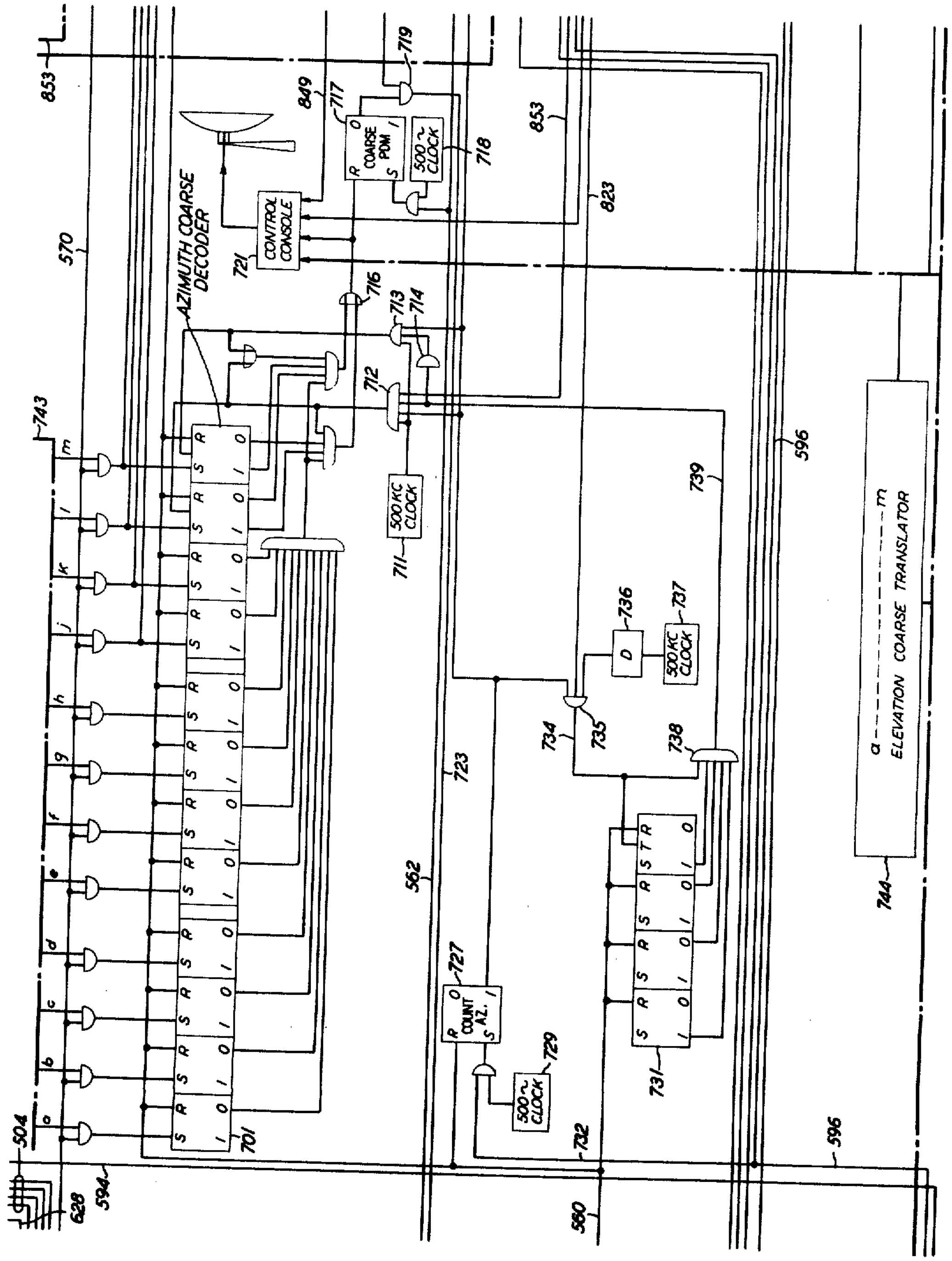
Figures 8, 9:
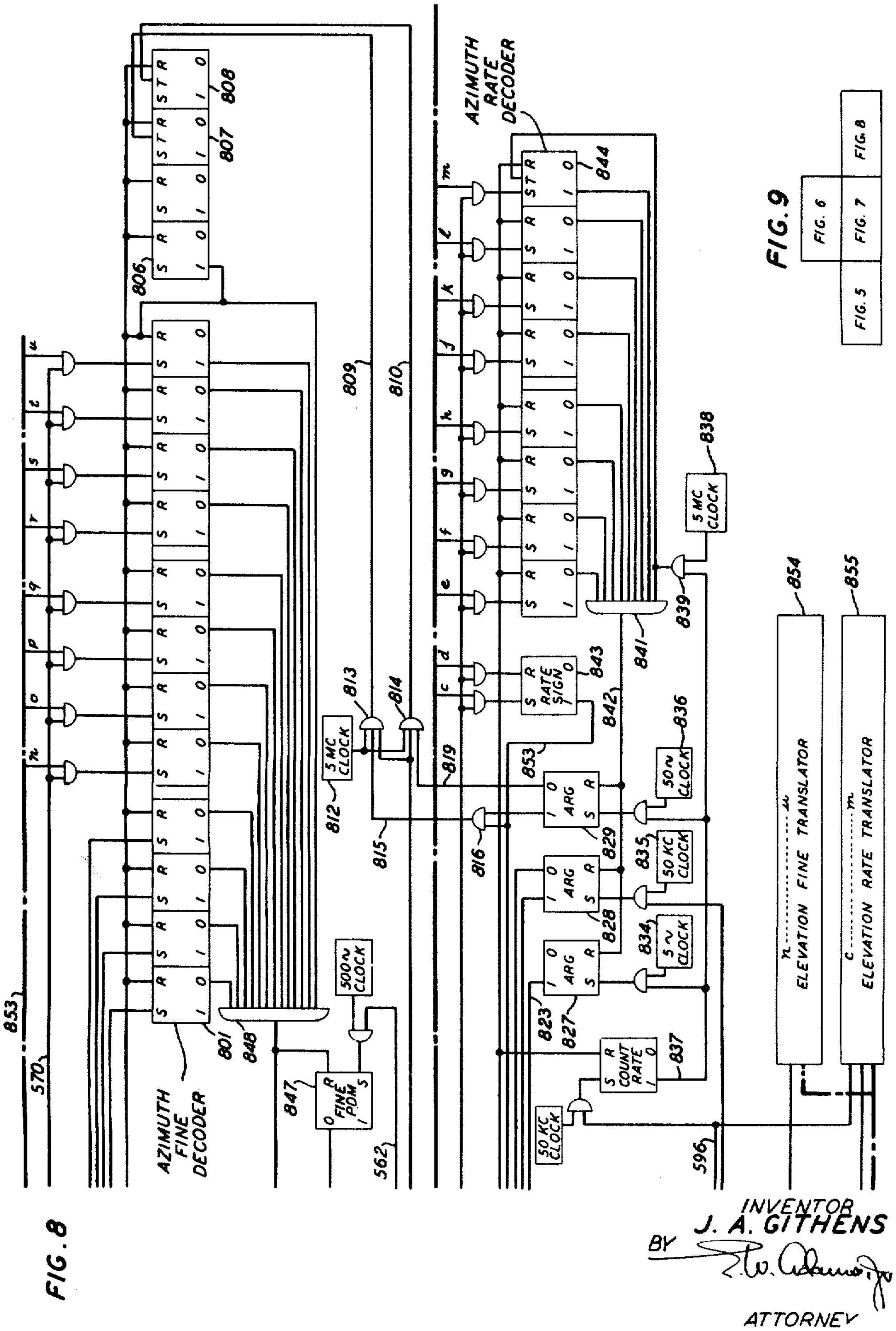

The logic drawing of the illustrative embodiment of this invention is made up of FIGS. 5, 6, 7, and 8, arranged as shown in FIG. 9. Conventional symbols have been employed and for reference purposes have been illustrated in FIG. 4. Elementary AND and OR gates having no inversion are illustrated in FIGS. 4A and 4B, respectively. An inverter, yielding logical negation, is shown in FIG. 4C. Delay means are shown in FIG. 4D, the duration of the delay period being amplified by the text. Bistable devices are represented as in FIG. 4E wherein it is assumed that a signal appearing at terminal S sets the device to "1," whereas, a signal appearing at terminal R resets the device to "0." In a number of arrangements, the bistable device has an additional input T, the effect of which is to change the state of the device whenever a signal appears thereat. Where clarity is enhanced, abbreviated functional designations are also included in the logic symbols. For example, flip-flop 843 in FIG. 8 contains the designation "Rate Sign" because the state of this flip-flop indicates the sign of the azimuth rate.

The particular circuitry used to perform the logic functions illustrated is optional, it being within the scope of one skilled in the art to employ electron tubes, transistors, or any other solid-state devices, including ferroelectric and magnetic elements.

As will become evident, shift registers and counters form a major part of the logic drawings to be considered. It should be understood that any form of conventional shift register or counter may be employed and that the logic illustration of them may be incomplete with respect to details. The counting decoders used for translators and depicted in FIGS. 7 and 8 are more fully described in the copending application of R. Klahn-J. C. Lozier, Serial No. 75,975, filed concurrently herewith on December 15, 1960.

*Detailed description*

Specific consideration of the operations of each portion of the circuit will be given after reiterating the various possibilities that arise as each character is read. Any character may contain a parity error and consequently have to be discarded. Each character must also be examined to determine whether or not it is a tag and if a tag, whether or not it is a time tag. As previously discussed, when a time tag is detected, correspondence of the stored time word with actual time must be insured.

Figure 5:
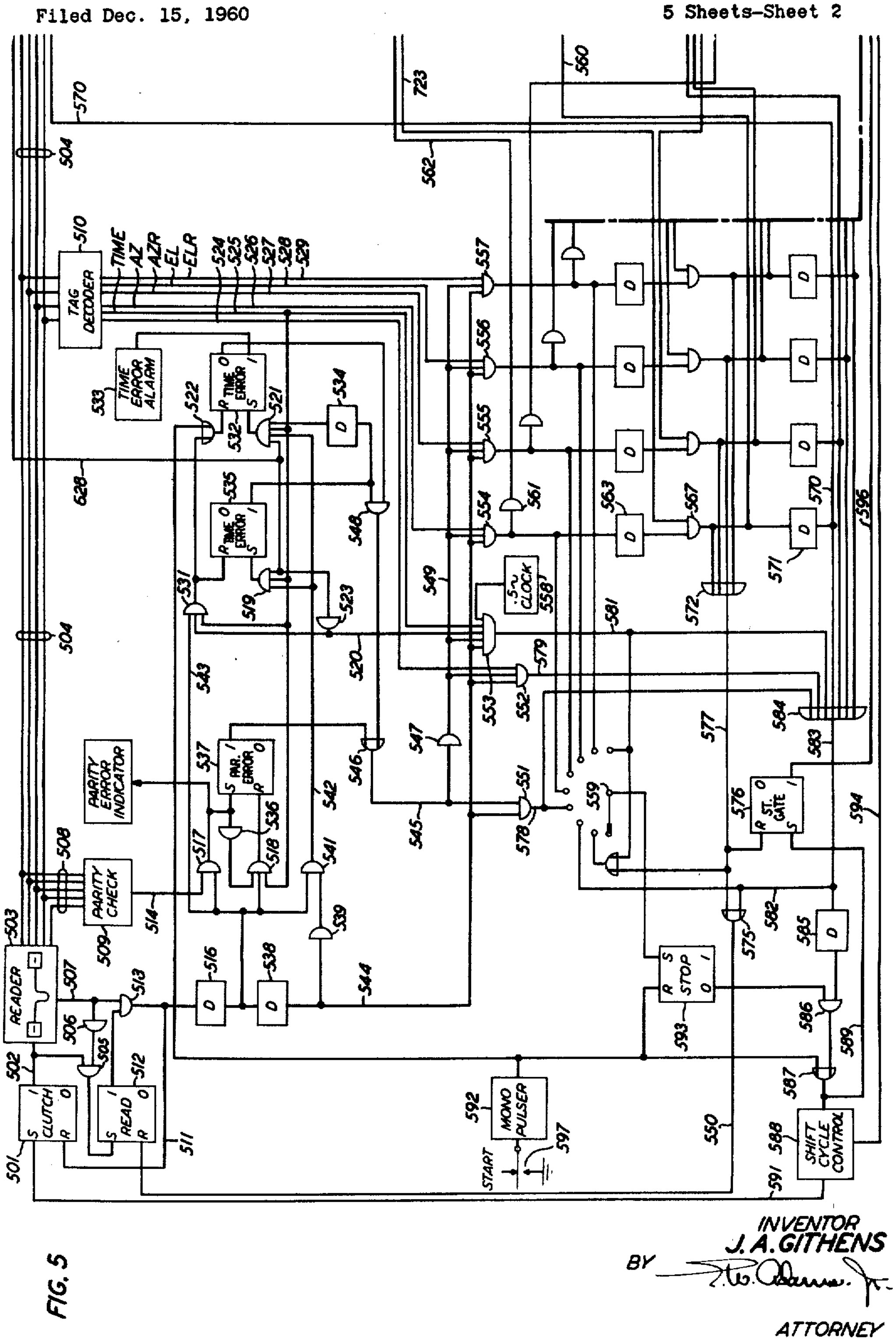
FIGS. 5, 6, 7, and 8 when assembled as shown in FIG. 9 comprise a logic schematic of the illustrative embodiment in which the invention is employed.

The reader 503 chosen to illustrate the present invention is of the common type employing a lamp to selectively energize photocells in accordance with tape perforations. In FIG. 5, the tap reader 503 is responsive to a signal on lead 502 to transport the tape across the reading apparatus, removal of the signal initiating the braking operation. When the tape has a character in position, the character is read and a signal appears on lead 507. As operated herein, the lamp is lit at all times and reading is controlled by the "sprocket" holes in the tape. Sprocket holes (a term carried over from mechanical readers) are present at each character position on the tape. They are smaller than the data holes and the output of the sprocket position photocell is amplified and sharply shaped in the reader to give a good gating pulse. Because the lamp is lit at all times, when the tape is stopped, the data outputs and the sprocket position output are energized continuously. Use is made of this feature to provide temporary storage for the system.

With these basic controls in mind, typical operation of the tape reader 503 may be considered. When clutch flip-flop 501 is set, the signal appearing on lead 502 sets the tape in motion, and the light disappears from the sprocket position photocell removing the signal on lead 507. The absence of a signal on lead 507 is inverted by inverter 506 and supplied as an input to AND 505 in combination with the "1" output of flip-flop 501. Consequently, a set impulse is applied to read flip-flop 512. When a character appears in reading position in tape reader 503, the sprocket output on lead 507 is energized by the appearance of the next sprocket hole. The output on lead 507 is applied in conjunction with the "1" output of flip-flop 512 to AND 513, creating a signal which is thereafter applied over lead 511 to reset clutch flip-flop 501 and cause the signal on lead 502 to terminate, permitting the reader 503 to initiate braking.

The reading operation is thus started by the character appearing over the photocells, causing signals to appear on the output leads 504. These signals are simultaneously examined by parity check circuit 509, which receives them over leads 508 and tag decoder 510. The parity check circuit 509 may be synthesized in any established manner and operative in the event all five bits of each character do not conform to a predetermined format. For example, FIG. 3 illustrates a format in which all characters contain an odd number of "1's" or holes. Parity checking, then, involves the operation of determining whether each code group contains an odd number of "1's." One obvious method of performing this check involves converting the parallel pulses of the code group, available on leads 508, to serial form in a delay line distributor such as that shown in FIG. 13.2*b* of "High Speed Computing Devices," by Engineering Research Associates, McGraw-Hill, 1950, and applying the serial pulses to a flip-flop circuit, the final state of which will indicate whether an odd number of "1's" has been received in the manner shown, for example, in Patent 2,892,888 to R. T. James et al., June 30, 1959. In the event of nonconformance, a signal is generated on lead 514, indicating a parity error.

If it is assumed that such an error occurred on the first character read, the operating sequence may be analyzed. The output of AND 513, which was used to reset clutch flip-flop 501, is also applied through delay 516 to AND 517 and to AND 518. Upon occurrence of an error signal on lead 514, therefore, AND 517 creates an output which is applied to set parity error flip-flop 537 and to inverter 536, the output of which, acting through AND gate 518, serves to reset parity error flip-flop 537 at the appropriate time, as determined by the output of tag decoder 510 and that of delay 538. The resulting output of parity error flip-flop 537 passes through OR 546 and is applied over lead 545 to AND 551. After the signal from delay 516 has passed through delay 538, it also is applied over lead 544 to AND 551, producing an output on lead 578 which is applied via OR 584 to leads 583 and 582, thence through OR 575 and via lead 550 to reset read flip-flop 512. It will be understood that the effect of resetting read flip-flop 512 will be to terminate the signal appearing at its "1" output and consequently generate a pulse of duration determined by the combined durations of delays 516 and 538. This pulse is thus applied over the path previously described to delay 585 and through AND 586 and OR 587 to the shift cycle control circuit 588. The only output of shift cycle control circuit 588 of interest in the present analysis is that appearing on lead 591, which output is effective to set clutch flip-flop 501 and thereby initiate movement of the tape to cause reading of subsequent characters.

Shift control circuit 588 is designed to respond to the application of a pulse from AND 586 by generating a pulse on lead 594 to control the shifting of the characters in the Word Assembly Register (FIG. 6) and thereafter by supplying a pulse on lead 591 to set clutch flip-flop 501. Should the specific shift register circuitry selected for the Word Assembly Register require a particular type of control pulse, a generator, amplifier, or similar circuit may be used to supply it. Either an active or passive delay means may be incorporated to yield the necessary time lag between the outputs on leads 594 and 591.

Under the usual conditions, parity errors will not arise and, therefore, the operation of the circuit will be determined by the outputs of tag decoder 510. Tag decoder 510 comprises a plurality of simple decoding circuits operating upon the signals impressed on lead 504 by reader 503. The output of tag decoder 510 indicates either that the character is not a tag or is a tag of a particular nature. A plurality of gates, arranged to detect the presence of particular tags would be suitable for tag decoder 510. However, any means for accomplishing the stated results is acceptable. For example, the decoding matrix shown at FIG. 4–3*a* of "High Speed Computing Devices," by Engineering Research Associates, McGraw-Hill, 1950, may be employed to provide outputs on separate leads 525 through 529 to identify the several tag codes. The output for lead 524, indicating that no tag has been received, may be derived directly from the information available on leads 525 through 529.

For purposes of description, assume first that the character being read is not a tag. In such an instance, tag decoder output 524 is energized, applying a signal to AND 552. As previously discussed with respect to initial reader operations in the case of a parity error, a signal has been generated at the output of AND 513 (indicative of the reading of a character) and applied to delays 516 and 538. This signal subsequently appears at an input of AND 552. AND 552 has three inputs, two just described, and the third appearing on lead 549 which, due to the presence of inverter 547, has a signal thereon only when there is no parity error. As described hereinafter, a signal on lead 549 also denotes the absence of a time error. Presence of signals on all input leads to AND 552 creates an output signal on lead 579 that is applied through OR 584 and over leads 583 and 582 to reset read flip-flop 512 and effectively generate a pulse of duration equivalent to the combined durations of delay 516 and delay 538. This generated pulse is applied through delay 585 and logic gates 586 and 587 to shift cycle control circuit 588. Responsive to this input a signal is generated on lead 594 and is applied in FIG. 6 to shift the characters stored in the Word Assembly Register one stage to the right. At the same time the new character appearing on leads 504 is gated into the Register via AND gates 622–625, the appropriate ones of leads 504 from the reader 503 being connected to form the second inputs to respective ones of the gate circuits. To function properly an arrangement of this type requires internal delay in each stage so that the outputs do not change while the inputs are gated. Subsequent to this gating operation, shift cycle control circuit 588 generates a signal on lead 591 to set clutch flip-flop 501 and cause movement of the tape in reader 503.

The operations initiated upon the reading of a tag by tag decoder 510 will be better understood after a description of the operation of the Word Assembly Register depicted in the lower portion of FIG. 6. The function of this register is to store data words until their identifying tag is decoded and provision is made for gating them to their respective translators for further operations. Basically, the Word Assembly Register comprises four standard shift registers, each register storing a particular bit of each word and being disposed from left to right in FIG. 6. Successive stages of each shift register are interconnected via AND gates 630, the "0" and "1" outputs driving the "R" and "S" inputs, respectively. The actual fabrication of any such shift register may be made in accordance with well-established practices as shown, for example, in FIGS. 13–25 of "High-Speed Computing Devices," by the staff of Engineering Research Associates, Incorporated, published by the McGraw-Hill Book Company, Incorporated, 1950. It will be understood that implementation of storage in such a register may be achieved by shifting the stored digits one stage to the right and then gating an additional character into the leftmost stage for storage. Consequently, each character will be encoded on a vertical group of stages and the entire word will be encoded with the first characters read appearing in the rightmost stages of the Word Assembly Register.

When a time tag is detected in accordance with the format adopted previously, the time word is in the Word Assembly Register and comparison of this time word with the local timing device 601 is underway. The local timing device 601 is illustrated across the top of FIG. 6. As indicated for the "units" portion of the "minutes" section and the "tens" and "units" portion of the "seconds" section, it will be seen to comprise a plurality of stages capable of residing in either a "1" or "0" state, the stages corresponding to the stages of the Word Assembly Register. The particular means of fabricating such a timing device are of no consequence, any arrangement developed by one skilled in the art being acceptable. Conveniently, the timing device as shown in FIG. 6 comprises a series of double stability circuits connected in tandem and comprising separate counters of hours, minutes, and seconds. These are driven by a precision oscillator as shown, for example, in Patent 2,486,491 to L. A. Meacham, November 1, 1949, and are interconnected to perform the functions of a digital clock. It will be noted that only the units digit of the minutes indication and the tens and units digits of the seconds indication are compared with the word stored in the Word Assembly Register. It will also be noted that the least significant binary digit of the seconds units is disregarded and that only three stages are used to indicate the tens digit of the seconds indication. By using only the units digit of the minute indication, the comparison takes place within a ten-minute interval only. This permits the translating and decoding equipment to be used for prechecking a tape even though the hours and hundreds digits of the minutes indication are noncorresponding. However, for purposes of visual and perhaps other monitoring, it is suggested that the entire timing indication be presented in some form for complete comparison with the word stored in the Word Assembly Register and recorded on the tape.

The time comparison circuit, shown just below local timing device 620 in FIG. 6, consists of a plurality of AND and OR gates arranged to provide a discrete output on lead 628 in the event noncorrespondence occurs between the time registered in the Word Assembly Register and the time indicated by timing device 601. The implementation of this objective involves the connection of outputs from each stage of the Word Assembly Register in combination with the opposite output of the corresponding stage in timing device 601 to an AND gate in order to provide a discrete output whenever noncorrespondence between the stages occurs. Each of these discrete outputs is processed through an OR gate until ultimately, final OR 609 passes an indication to lead 628. A typical example of such interconnection is evident with respect to stage 614, the last stage in the lowermost shift register. It will be noted that in this instance, the "0" output is connected in combination with the "1" output of its corresponding stage in timing device 601 to AND 602. The "1" output of stage 614 is combined with the "0" output of the corresponding stage in timing device 601 at AND 608. The outputs of both AND gates 602 and 608 are processed via OR 627 and finally OR 609, insuring a discrete signal on lead 628 in the event stage 614 does not correspond to its mate in timing device 601. Similar connections between the final stages 612 and 613 of the four shift registers and the outputs of the timing device 601 are made by way of AND gates 603 and 607, and AND gates 604 and 606, respectively, the outputs of these AND gates being applied by way of OR gate 605 for eventual application to OR gate 609.

Because our system of time designation recognizes a maximum indication of twenty-four hours, sixty minutes, and sixty seconds and because the Word Assembly Register has a capacity in binary coded decimal notation for ninety-nine hours, ninety-nine minutes, and ninety-nine seconds, there are several stages of the Word Assembly Register that will always be "0" during the storage of a timing word. Specifically, the stages are 615, 616, 617, and 618. An additional reliability check is obtained by connecting the "1" outputs of each of these stages through OR gates to lead 628. Thus, if any of these stages resides in a "1" state, a time error is indicated.

It is now possible to analyze the operation of the system when a time tag is detected by tag decoder 510. As previously mentioned, the desired effect upon occurrence of a time error is to disregard the subsequent data words in the data block associated therewith and the examination of the following time word. If this second time word does not correspond to the time set in the local timing device 601, the entire system rests until correspondence does occur. Timing error flip-flops 535 and 532 are used to achieve this result.

Assuming that the character being read is a time tag, a signal will appear on lead 525. Simultaneously, if there is an error in the comparison between the word stored in the Word Assembly Register and timing device 601, a signal will appear on lead 628. The signal on lead 628 is applied to AND gates 519 and 521. Other inputs to AND 519 designate that the tag is a time tag as evidenced by a signal on lead 525, and a pulse of duration determined by delays 516 and 538 derived from the output of read flip-flop 512 as processed by delays 516 and 538, inverter 539 and AND 541 over lead 542. It will be recalled that as each character is being read, read flip-flop 512 is in a "1" state. Delaying this state by delay 516 and applying the output thereof through inverter 539 to AND 541 will result in a pulse of duration equal to that of delay 538. It will be seen, therefore, that AND 519 has all input energized and will produce an output to set time error flip-flop 535. The resulting "1" state of time error flip-flop 535 is combined with the unset or "0" state of its companion time error flip-flop 532 in AND 548, producing an output processed via OR 546 and applied to one input of AND 551. It will be recalled that the other input of AND 551 is the output of delay 538 and consequently coincidence occurs, producing a signal on lead 578 which is effective to reset read flip-flop 512 and set clutch flip-flop 501 to resume movement of tape reader 503. In order to disable all decoding equipment and thereby prevent translation of subsequent data words, the output of OR 546 is inverted by inverter 547 and applied to each of gating logic elements 552 through 557. The effect of such application, which in fact is a negation of signal presence, will be to prevent AND gates 552 through 557 from operating normally and initiating the translating actions to be hereinafter described in detail.

In view of the disablement of AND gates 552 through 557, the tape reader 503 will read, but the balance of the equipment will disregard all subsequent data until the time tag is again detected by tag decoder 510. At this time, of course, the time word will be stored in the Word Assembly Register and comparison with timing device 601 will be in process. Assuming a second noncorrespondence, once again a signal will be present on lead 628 and this signal will be simultaneously applied to AND gates 519 and 521. The inputs of AND 521 include those previously considered for its companion AND 519 and, in addition, a lead from the "1" output of time error flip-flop 535, thus insuring that this is the second time a noncorrespondence has been detected. The signal from time error flip-flop 535 is delayed by element 534 which should have a duration greater than that of delay 538. The second noncorrespondence of time causes time error flip-flop 532 to be set, causing energization of time error alarm 533.

It will be recalled that the read flip-flop 512 and clutch flip-flop 501 were respectively reset and set by an output from AND 548 and associated circuitry. Due to the setting of time error flip-flop 532, this output is no longer present because one of the inputs to AND 548 is eliminated. Consequently, no clutch signal will be applied over lead 502 to the reader 503 and the tape will remain immobile until time error flip-flops 535 and 532 are reset, the condition for this resetting being correspondence between the stored time and that registered on timing device 601.

Two means are provided for resetting the time error flip-flops 535 and 532 upon correspondence of the time word and actual time. One of these is a manual reset under control of monopulser 592 located in the lower portion of FIG. 5. (This means will be considered later in the description.) The other reset is automatic and occurs under the control of AND 531. Three inputs are provided to this gate: one occurring over lead 543 indicates that read flip-flop 512 is set; another appearing on lead 520 indicates that the times correspond; and a third occurring on lead 525 indicates that a time tag is presently being read by reader 503. Occurrence of these three conditions produces an output processed by OR 522 and applied to reset time flip-flop 532. The output of AND 531 is also applied to reset time error flip-flop 535.

When the time word and local time compare, the absence of a signal on lead 628 is inverted by inverter 523 to produce a signal on lead 520 thereby indicating a correspondence. This signal is applied to one input of AND 553. Other inputs to AND 553 include the read flip-flop 512 output delayed by delays 516 and 538, the fact that no error exists as evidenced by a signal on lead 549, the fact that a time tag is being read as evidenced by a signal on lead 525, and a signal from half-cycle clock 558. Coincidence of all of these inputs produces a signal on lead 581 that is processed in the manner hereinbefore described by OR 584 and succeeding elements to reset read flip-flop 512 and set clutch flip-flop 501 for tape transport.

The local timing device 601 is set one second fast so that it indicates actual time plus one second. Thus, prior to the actual time at which the next block of information should be decoded, the comparison circuit indicates correspondence. When 0.5 c.p.s. clock 558 indicates time to decode the next block, reader 503 commences reading under control of clutch flip-flop 501. Each character on the tape is examined by the tag decoder 510 and if the character being read is not a tag, the Word Assembly Register is set one digit to the right and the new character entered on the left. The sample data points are restricted to the odd second and the least significant binary digit of the seconds unit decimal digit is ignored in the time comparison as previously pointed out. The result of these features is that for data blocks in the proper sequence, the comparison circuits will indicate correspondence as soon as the time tag is detected in the reader 503 and this correspondence indication will hold for the full two-second interval. If, when a time tag is read, the contents of the Word Assembly Register and the local timing device 601 do not correspond, as previously described the tape is advanced to the next time tag. If the second time word does correspond, the circuit proceeds as normally and, if not, marks time and gives an alarm. Thus in the event of a time comparison failure, the system makes a quick check to see that it has not lagged behind as might happen due to an error making a data character look like a time tag. If the comparison check still fails, the system alerts the operating personnel. However, if because of transmission drop-outs or errors the system has become a few seconds ahead, it will automatically correct itself, probably before any manual maintenance routines can be initiated.

It should be noted that when a time tag is detected in the reader 503, the time word has been in position in the Word Assembly Register for the time it took to move the tape and attain the time tag. Thus, the time comparison logic can be quite slow. Also, for the same reason, the speed of the local timing device 601 may be relatively slow.

If the character being read is a tag other than a time tag, the proper translating circuit must be selected and the word stored in the Word Assembly Register gated thereto. If the tag is azimuth, for example, the output on lead 526 of tag decoder 510 will be energized. This output is applied to AND 554 in combination with the signal from read flip-flop 512, delayed by delays 516 and 538, and also in combination with the signal on lead 549 indicating no error. The output of AND 554 is inverted by inverter 561 and used to prepare the azimuth translators by way of AND gates 715 and 846, respectively, for receipt of new data. The output, delayed by delay 563, is also applied to AND 567 which has an additional input from the azimuth translators indicating that they are "ready." Thus, the output of AND 567 indicates that the azimuth translators are ready for new data and is used to "clear" the azimuth coarse and fine translators. The output of AND 567 is also directed through OR 572 and over lead 577 to OR 575 in order to reset read flip-flop 512. It will be seen that the duration of the "clear" pulse applied over lead 560 is equal to the sum of delays 516, 538, and 563. As will be later amplified, the "clear" signal on lead 560 also resets start count gate flip-flop 727 to inhibit the start of any counting action while the azimuth translators are being cleared and gated. The "clear"

azimuth pulse is also applied to delay 571, the output of which appearing on lead 570, "gates" the word stored in the Word Assembly Register into the azimuth translators by way of AND gates connected over leads *a* through *m* of cable 743 to the Word Assembly Register and to gating lead 570. Delay 571 should be greater than the sum of delays 516, 538, and 563 to insure that the "clear" signal is removed from the azimuth translators before the "gate" signal is applied. The gating signal is also applied via OR 584 and delay 585 to the shift cycle control circuit 588, assuring that the "gate" signal is, in turn, removed from the translators before any shifting under the control of a signal on lead 594 is done in the Word Assembly Register. Thus, delay 585 should equal delay 571. The pulse output of delay 585 initiates the shift cycle and also sets the start count gate flip-flop 576 so that counting can be started in the azimuth translators in synchronism with the next reference clock pulse.

Consideration may now be given to the operations performed in the translator circuits in order to convert the binary coded data into analog signals appropriate for controlling antenna servomechanisms. The Azimuth Coarse Translator is shown in the upper portion of FIG. 7 and comprises a counting decoder 701 with appropriate control and output circuitry. The Azimuth Fine Translator and the Azimuth Rate Translator appear in detail in FIG. 8, while the remaining translators appear as blocks in FIGS. 7 and 8.

The digital azimuth and elevation angles are converted to time intervals in clocked synchronous counting decoders 701 and 801. These have been illustrated diagrammatically in FIGS. 7 and 8. A more detailed description of the operation of these decoding circuits appears in the copending patent application of R. Klahn and J. C. Lozier, referred to above. The operations performed within these counting circuits will be described herein only with the specificity required for a complete understanding of the system operation. Because the azimuth and elevation data are handled in the same way, the following description is confined to azimuth and azimuth rates.

Counting decoding is not new, an example thereof being shown in application Serial No. 579,516, filed by George H. Myers on April 20, 1956 (now United States Patent 2,954,165, which issued September 27, 1960). The digital number to be decoded is placed in a subtracting or countdown counter and the counting is started in synchronism with a reference pulse. As the counter goes through 0, it produces an output. The time difference between the reference pulse and counter output is proportional to the digital number being decoded and of a granularity determined by the counting rate. The system thus produces a pulse position modulated (PPM) output. If the counting is done continuously in synchronism with a reference pulse, a continuous decoding of the number is achieved.

All counting is done in synchronism under the control of a master clock or pulse generator. For brevity of illustration, however, a plurality of clocks, such as 711, 718, 729 and 737, are shown in FIG. 7 of the drawings at the position where clock outputs are used. It should be realized that a master clock operating at 5 megacycles, for example, might provide the basic signals and all other signals could then be derived therefrom by division. Counting is initiated under control of flip-flop 576 appearing in the lower left portion of FIG. 5. Flip-flop 576 is first placed in a "0" state by the clear pulses generated via logic gates 554 through 557. After new data is placed in the decoders 701 and 801, a signal on lead 589 sets flip-flop 576 to a "1" state and thereby generates a gating signal on lead 596 which enables the counting circuitry.

The 5-digit azimuth angle used in the present system is divided into coarse and fine components. The coarse component is made up of the three most significant digits of the azimuth word, and the fine component is made up of the three least significant digits of the azimuth word.

It will be noted that the least significant digit of the coarse component is, therefore, identical with the most significant digit of the fine component. The coarse and fine angles are placed in separate counters 701 and 801 and counted down at the same effective or basic 500 kc. rate. The pulse repetition rate of the reference clock and the output is thus 500 cycles.

As previously assumed, new azimuth data is provided at two-second intervals. However, because the input data is entirely predetermined, it is possible to update the contents of the azimuth counters by digital interpolation and thereby achieve an effectively higher rate. This improves the accuracy and gives the system a desirable coasting feature in the absence of input information. The format of the azimuth rate information has previously been described. It will be recalled that it consists of two decimal digits and a polarity indication.

All counters employed in the present description are of the countdown variety with the exception of coarse increment counter 731 which counts up. Although both the coarse and fine azimuth decoders 701 and 801 are counted at a basic 500 kc. rate, the counting pulses for the fine azimuth decoder 801 are derived from an additional decimal counter 806 that is driven by 5 megacycle clock 812. The purpose of the extra decimal stage is to provide for interpolation. It is obvious, however, that in the absence of any interpolation, the effect of this decimal stage is to divide the 5 megacycle clock pulses by ten and, therefore, provide a 500 kc. output for driving fine azimuth decoder 801. The updating of information in the azimuth decoders 701 and 801 is accomplished by controlling the 5 megacycle input to decimal counter 806. If the sign of the azimuth rate is positive, an appropriate number of 5 megacycle input pulses are inhibited so that the output of counter 806 occurs at a rate somewhat less than 500 kc. and, consequently, the subtractive counting proceeds at a reduced rate. If the sign is negative, the 5 megacycle input pulses are directed to the second binary stage 807 of counter 806, thus increasing the output of counter 806 to something greater than 500 kc. and effectively increasing the rate of subtractive counting in azimuth fine decoder 801.

The interpolation is under the control of azimuth rate decoder 844 which comprises two decimal stages of a subtracting counter driven at 5 megacycles. An additional binary stage 843 stores the azimuth rate sign. The output of azimuth rate decoder 844 is a pulse when the counter goes through zero. This is obtained from AND 841 whose input includes: leads from the "0" output of each stage of the decoder 844 but the first; a lead from the "1" output of the first stage; and a lead from the 5 megacycle clock 838 by way of AND gate 839. Thus, AND 841 yields an output when the decimal states of the counter are 0000 0001, and the next driving pulse arrives to set the counter to zero. This basic scheme is used in all of the decoding counters. The output of AND 841, a PPM (pulse position modulated) signal of 50 kc. repetition rate, is used to reset azimuth rate gate flip-flops 827, 828, and 829 by way of lead 842. Flip-flop 829 is initially set by 50 c.p.s. clock 836 and, therefore, converts the PPM output of the azimuth rate decoder 844 to a PDM (pulse duration modulated) signal whose duration is proportional to the azimuth rate number. The maximum duration is 20 microseconds with a repetition rate of 50 cycles. The PDM output controls the 5 megacycle input of counter 806 over leads 815 and 819. When the output of flip-flop 829 is "0," 5 megacycle pulses are applied through AND 814 and over lead 810 to the first stage 808 of counter 806 and there is no interpolation. However, when the 50-cycle clock pulse occurs, flip-flop 829 is switched to "1." The "1" output is combined in AND 816 with an indication on lead 853 that the rate sign is positive or negative. If the rate sign is positive, flip-flop 843 is in the "0" state and, consequently, there is no output from AND 816; therefore, 5 megacycle clock 812 has no path over which to trigger counter 806, and counter 806 is consequently disabled during this period. If the sign is negative, flip-flop 843 is in the "1" state, applying a signal over lead 853, enabling AND 816 and thus, in turn, enabling AND 813. In this instance the 5 megacycle clock pulses are applied over lead 809 to the second stage of counter 806 for a period of time proportional to the azimuth rate. Thus, 100 times each data interval, as many as twenty 5 megacycle pulses are either deleted or subtracted at twice the rate, depending on the rate sign, from the input of fine counter 801.

Because the rate information is being used to modify fine azimuth decoder 801, means must also be provided for updating coarse azimuth decoder 701. To provide the proper weighting, the azimuth rate gate is divided by ten in flip-flop 827 and added to counter 731 ten times each period. The output of flip-flop 827, appearing on lead 823, is a gate occurring five times per second. This gate is converted to a pulse train of 500 kc. pulses, the number of which represents the duration of the gate. Since the maximum duration of the azimuth rate gate is 20 microseconds, the pulse train may contain as many as ten pulses. The conversion is accomplished in AND 735 having as inputs the azimuth rate gate and 500 kc. clock 737 delayed by delay 736. Delay 736 is of 1 microsecond duration to provide an effective round-off. The resulting pulse train, appearing on lead 734, is applied to converter 731 which comprises a single decimal stage counter.

As compared to the other counters, counter 731 is additive, rather than subtractive. Its output is examined by AND 738 which in effect detects a 9 (i.e., 1001) coupled with the occurrence of the next input pulse. This condition can occur ten times per interval, producing a signal on lead 739. Such a signal, due to the action of inverter 714, inhibits one pulse from 500 kc. clock 711 and thereby increases the output of coarse azimuth decoder 701. If the sign of the rate is negative (evidenced by flip-flop 829 being in the "1" state, and lead 853 being energized) a pulse from 500 kc. clock 711 is gated via AND 712 to the second stage of the coarse decoder 701, doubling the subtractive rate and thereby decreasing the output thereof.

The output of fine counter 801 is connected to a zero detector including AND gate 848 and similar to that described with respect to the azimuth rate decoder 844. The output is a PPM signal modulated at a 500-cycle rate. The output of the coarse counter 701 is also a PPM signal but the zero detector is slightly different. In the case of the coarse counter, since the interpolation pulses enter directly into stages being zero detected, several additional logic elements are employed. The arrangement of AND gates 706, 707, and 708 in FIG. 7 associated with azimuth coarse decoder 701 provides for an output when the counter goes through zero if the state is 0000 0000 0001 and either the next normal input or double rate input is received, or if the state is 0000 0000 0010 and a double rate input is received.

Yet another output supplied by rate decoder 844 is an azimuth rate gate at 500 kc. provided via flip-flop 828 which provides a PDM signal for instrument servomechanisms in control console 721.

The specific loading of new angles into the decoding translators may now be considered. The decoder outputs are continuous, i.e., 1000 PPM outputs are produced by the coarse and fine decoders each data interval. Inserting new information at the end of two-second data intervals must be done without introducing discontinuities in these outputs. Since the counters are cleared and gated, this may be done if the new information is inserted after the counters have gone through zero and before the next reference pulse. Considering again the azimuth word, which is inserted part in coarse decoder 701 and part in the fine azimuth decoder 801, this must be done after they have both gone through zero and before the next 500-cycle reference pulse from clock 729. The procedure is complicated because the interval may be quite short if the numbers being decoded are large or zero, and because there is no synchronization between the control unit and the decoders. Consequently, there may be very little time in which to insert information.

It will be recalled that when an azimuth tag is detected and there are no errors, a signal is produced at the output of AND 554. This signal is inverted by inverter 561 and applied over lead 562 to inhibit the setting of the coarse and fine PDM flip-flops 717 and 847, respectively, by the 500 c.p.s reference pulses It will be apparent that the outputs of flip-flops 717 and 847 are pulse duration signals corresponding to the PDM outputs of decoders 701 and 801, respectively. When both these flip-flops are in the "0" state, information can be transferred to the coarse and fine decoders 701 and 801. When they occupy such a state, an "azimuth ready" signal is supplied over lead 723 which is derived from the "0" output of each of flip-flops 717 and 847 combined in AND 719. The reference pulse "setting" input is inhibited so that when a request is made shortly before a reference pulse, setting of the flip-flops 717 and 847 does not remove the "ready" signal prematurely. Delay 563 is inserted to assure that should the request arrive only shortly behind the reference pulse, the "azimuth ready" signal is removed from AND 567 before the request signal arrives.

Energization of lead 723 produces a "clear" signal as an output from AND 567 which is applied over lead 560 and is thereby coupled to all reset terminals of decoders 701 and 801 to clear the decoders for storage of new data. This signal also resets count azimuth flip-flop 727 to "0," thereby inhibiting the counting pulses to the coarse and fine decoders 701 and 801 and to coarse increment counter 731. The "clear" signal on lead 560 also resets start count gate flip-flop 576 which inhibits the setting of count azimuth flip-flop 727 by reference pulses from clock 729. As previously described, the "clear" signal is followed by a "gate" signal on lead 570 which enables the AND gates associated with azimuth fine decoder 801 and the corresponding AND gates associated with azimuth coarse decoder 701, transferring the words from the Word Assembly Register to the decoders 701 and 801. Following gating, start count gate flip-flop 576 is set, removing the inhibit from the setting path of count azimuth flip-flop 727. The new angles are now in the decoders 701 and 801, but since count azimuth flip-flop 727 is still at "0," no counting is being done. Arrival of the next reference pulse from 500 c.p.s. clock 729 sets count azimuth flip-flop 727 and counting commences in synchronization with the reference pulse.

In FIGS. 6, 7, and 8 the leads *a* through *y* from the Word Assembly Register are shown assembled into cable 629 and then distributed in accordance with lower-case alphabetical designations to appropriate stages of the decoders of the various translators. The interconnections shown are selected for operation with the data block format originally assumed in which the least significant digits were recorded first in each word. It is possible, and perhaps desirable, to reverse the order of data presentation; in such a case, the interconnections would have to be modified accordingly.

The PPM output signals generated by decoders 701 and 801 are directed to control console 721. This console embodies equipment responsive to the output signals for controlling antenna positioning servomechanisms. Similar signals are generated by elevation translators, illustrated in FIGS. 7 and 8 as boxes 744, 854, and 855. As previously mentioned, the elevation control circuits are similar to the azimuth circuit described and, therefore, description is deemed unnecessary.

*Manual control, testing, and starting*

To facilitate testing, trouble-shooting, and initial operation of the system, manual controls have been incorporated.

To provide for selective stopping of the system for trouble-shooting routines, stop selector switch 559 has been included. This switch selects the setting function for stop flip-flop 593. As shown, selector 559 is in the normal or neutral position where it causes no stopping. In position 4, the selector 559 causes stop flip-flop 593 to be set on any error. Upon being set, stop flip-flop 593 inhibits AND 586 and consequently stops the system with the character in error over the photocells of reader 503. On time errors, the system stops with the erroneous time in the Word Assembly Register.

This mode of operation will be useful in obtaining a first order check on the integrity of input tapes. Thus, at some multiple of ten minutes prior to the actual run, the input tape can be run through the system to detect any parity error or time discrepancy troubles.

In position 3, the switch 559 causes the system to stop on each character in detailed trouble-shooting. For this trouble-shooting, another switch should be provided to make the output 628 of the time comparator indicate time correspondence under all circumstances. In position 2, the switch 559 halts the system on all tags. Note that the system stops after the gating from the Word Assembly Register to the translators but before there is any shifting and before start count gate flip-flop 576 has been set. When the system is stopped on a tag, the tag is on the output of reader 503 (this may be visually displayed) and the tag word is in position in the Word Assembly Register. Since the counting has been stopped and the tag word has been transferred to the designated decoder, it is possible to check that this transfer has been made properly by observing the static contents of the decoder.

The remaining five positions of the switch 559 cause the system to stop selectively on time, azimuth, azimuth rate, elevation, elevation rate tags, and time, respectively.

To start the system after a stop, start button 597 and associated monopulser 592 are provided. The function of the monopulser is to resupply the pulse that was inhibited by stop flip-flop 593. For each actuation of start button 597, monopulser 592 produces a single pulse of duration determined by delay 516 pulse delay 538. This pulse is applied to OR 587 feeding the shift cycle control 588 and starts the action by shifting the Word Assembly Register. The pulse also resets stop flip-flop 593 and time error flip-flop 532. This latter feature provides a means of correcting the most common stoppage encountered in actual runs. It will be recalled that time error flip-flop 532 is set on the second consecutive time error, tying up the system and giving an alarm. Since the noncorrespondence may be due to errors in the time word, when the alarm is given the first step by operating personnel should be to actuate start button 597. This resets time error flip-flop 532 and allows the system to proceed to the next time tag. If the time is still in error, the display of the local time and the contents of the Word Assembly Register should be observed. If the time word in the Word Assembly Register is less than the local time, start button 597 should be actuated an appropriate number of times to bring the tape into step. If the time word is greater than the local time, the system should be left alone and it will resynchronize itself.

Start button 597 is, of course, useful for starting the system initially. An initial set button may be provided to initially set clutch flip-flop 501, read flip-flop 512, and error flip-flops 537, 538, and 532 to "0." It is desirable to initially clear the decoders; however, while desirable, this feature is not essential.

The previous description illustrates an embodiment of the present invention as an element of the antenna control system of a satellite communication network. Other applications of the invention are inherent in view of the preceding teachings and consequently may be developed without departing from the spirit or scope of the invention as set forth by the claims.

What is claimed is:

1. In a system for translating sequentially presented sets of data for use at particular times, the particular time for use of each set being encoded immediately preceding each said set, timing means producing signals representative of time, means for comparing said signals and the encoded particular times, translating means, means controlled by said comparison means and operative in response to correspondence of said signals and said encoded times to enable said translating means to translate the succeeding set of data, and means controlled by said comparison means and operative in response to noncorrespondence of said signals and said encoded times to intiate comparison of said signals with the succeeding encoded times.

2. In a system as defined in claim 1, means controlled by said comparison means and operative in response to a noncorrespondence of said signals with two successive encoded times to establish continual comparison until correspondence occurs.

3. In a system for translating sequentially received characters grouped according to word patterns wherein each word pattern is identified by a discrete character received immediately subsequent thereto and is preceded by a timing word representing the time at which said word pattern is to be translated, means for storing each word pattern as received, individual translating means for each word pattern, means normally responsive to detection of said discrete characters to produce outputs individually representative thereof, connecting means controlled by said representative outputs to connect said storing means to the translating means associated with the word pattern stored therein, timing means producing time-representative signals, means for comparing the timing word pattern with said signals, and means controlled by said comparison means upon non-correspondence of the quantities compared to disable said connecting means and initiate comparison between said signals and the next timing word pattern received.

4. In combination with the system defined in claim 3, means controlled by said comparison means upon noncorrespondence of said next timing word pattern and said signals to disable said connecting means and to establish continuous comparison of said next timing word pattern with said signals.

5. In a circuit for decoding pluralities of sequentially received discrete sets of data, said sets having interposed therebetween signals representative of the nature of the preceding set wherein the first set of data in each plurality designates the time at which the remaining sets in that plurality is to be decoded, a timing means registering local time, a register for storing said sets of data as received, comparing means for recognizing identity between the time registered on said timing means and the data registered in said register, signal interpreting means operative in response to receipt of the signal representative of said timing set of data to enable said comparing means, and means operative upon nonrecognition of said identity for by-passing all remaining data in the plurality associated with the nonrecognized timing set of data and thereupon initiating comparison of the time registered on said timing means with the time set of the subsequent plurality of sets of data.

6. In a satellite tracking system, a coded record of the orbital positions of said satellite at particular times having sequentially coded therein the time of each said position, and the azimuth and elevation angles of each said position, time means producing time indicating signals, comparison means for comparing said coded time with said time indicating signals, decoding means responsive to said coded record of azimuth and elevation positions to yield outputs discretely indicative thereof, means controlled by said comparison means to disable said decoding means upon noncorrespondence of said coded time and said signals and to advance said coded record for said comparison means to act upon the next coded time, and means controlled by the output of said decoding means to track said satellite.

7. In a system as defined in claim 6, means controlled by said comparison means upon noncorrespondence of said next coded time and said signals to disable said decoding means and maintain comparison of said next coded time and said signals until correspondence occurs.

8. In a system as defined in claim 6 wherein said azimuth and elevation data are immediately followed by azimuth rate-of-change and elevation rate-of-change data respectively, additional decoding means responsive to said rate-of-change data operative upon noncorrespondence of said coded time and said signals to modify the outputs of said decoding means in accordance with said rate-of-change data.

9. In a translation system, a coded record of data points for use at particular times having sequentially encoded therein (1) the time each said data point is to be used, (2) representations of said data points, and (3) the difference between said data points from one recorded time to the next immediately succeeding recorded time, storage means for storing said data points, decoding means, gating means for connecting said storage means to said decoding means, timing means producing time indicating signals, comparison means for comparing said coded time with said time indicating signals, means controlled by said comparison means to disable said gating means upon noncorrespondence of said coded time and said signals and to advance said coded record for comparison with the next coded time, and means controlled by said comparison means to disable said gating means upon noncorrespondence of said next coded time and said signals and maintain comparison of said next coded time and said signals until correspondence occurs.

10. A system as defined in claim 9 in combination with translating means controlled by said decoding means yielding discrete outputs for each data point, and additional decoding means controlled by said difference between data points and operative upon noncorrespondence of said coded times and said signals to modify the outputs of said translating means to yield an output substantially equivalent to that of the succeeding data point at the time said succeeding data point is to be used.

References Cited by the Examiner

UNITED STATES PATENTS

| | | | |
|---|---|---|---|
| 2,287,786 | 6/42 | Diamon et al. | 340—147 |
| 2,680,240 | 6/54 | Greenfield | 343—6 |
| 2,796,620 | 6/57 | Hess et al. | 343—6.5 |
| 2,946,044 | 7/60 | Bolgiano et al. | 340—172.5 |
| 2,980,903 | 4/61 | Hagopian et al. | 343—6.5 |

MALCOLM A. MORRISON, *Primary Examiner.*

IRVING L. SRAGOW, *Examiner.*